United States Patent [19]

Adams

[11] 3,941,209

[45] Mar. 2, 1976

[54] WEDGING SAWHORSE STAND

[76] Inventor: Larry D. Adams, 872 Weber Drive, Yardley, Pa. 19067

[22] Filed: Dec. 11, 1974

[21] Appl. No.: 531,651

[52] U.S. Cl. .................................. 182/186; 182/226

[51] Int. Cl.[2] .......................................... F16M 11/00

[58] Field of Search .................... 182/186, 181–185, 182/226, 225, 224, 151; 248/165, 188

[56] References Cited

UNITED STATES PATENTS

| | | | |
|---|---|---|---|
| 1,462,707 | 7/1923 | Lawlor | 182/181 |
| 2,343,557 | 3/1944 | Johnson | 182/186 |
| 3,024,865 | 3/1962 | Campbell | 182/226 |
| 3,241,633 | 3/1966 | Bond | 182/186 |

FOREIGN PATENTS OR APPLICATIONS

| | | | |
|---|---|---|---|
| 551,893 | 1/1923 | France | 182/186 |

*Primary Examiner*—Reinaldo P. Machado
*Attorney, Agent, or Firm*—Sperry and Zoda

[57] ABSTRACT

An easy to assemble and disassemble doublewedging sawhorse including a horizontal beam supported by pairs of vertical legs, each pair of legs being separated by a slotted shelf mounted in slots in the legs and wedged therebetween, each pair of legs being connected by a tie rod at a point above the shelf and below the beam, having oppositely tapered angular grooves therein such that the tapered edges and the grooves meet and provide a wedging action which increased the pressure of the legs against the beam as the beam is forced further downwardly.

5 Claims, 3 Drawing Figures

WEDGING SAWHORSE STAND

BACKGROUND OF THE INVENTION

1. Field of the Invention

This invention deals with the field of sawhorses, self-sustaining scaffolds, ladder scaffolds, and scaffold horses. These items are primarily useful for supporting workpieces and providing temporary scaffolding structures.

2. The Scope of the Prior Art

Structures utilized in the prior art have inherently been more complicated than the present invention and have required the use of additional hardware. In particular, a great variety of different bracket and leg assemblies have been utilized for securing the horizontal beam in position. The beam has been secured to the legs through complicated shoulder abutting arrangements and conventional permanent attachment means such as mailing or bolting. Many sawhorse structures use trapedzoidal bracket members to connect each pair of legs and to provide a bracket area for the beam to be attached.

All the additional metal and wooden parts required in conventional sawhorses greatly increase the cost and complication of this relatively simple apparatus. Prior art sawhorse assemblies which are capable of being disassembled tend to be even more complicated than permanent units. Sawhorses which are capable of disassembly have heretofore utilized various snap-in and snap-out attaching means to effect quick assembly and disassembly.

SUMMARY OF THE INVENTION

The present invention is a simple and yet sturdy wedging sawhorse adapted to be readily assembled and disassembled. The main support is provided by the cross-beam which has pairs of angular tapered grooves therein. The grooves are tapered such that the depth of the grooves is deeper at the lower section of the beam and is shallower at the upper section of the beam. In this manner, the cross-section of the beam at the point of the groove provides a trapezoidal wedge with its narrower parallel edge along the lower portion of the beam and serves to urge the upper ends of the legs apart.

The legs are obliquely tapered at the upper edge such that when being assembled the oblique edges of adjacent legs form a path into which the trapezoidal wedge of the beam mates. In this manner, as the beam is pushed downward, each set of legs is wedged apart.

The legs also have slots along the inner edges in the lower section to accept a normal flat slotted plank which provides a shelf. Between the point where the slots are located and the upper edge, is a horizontal aperture through both legs in which protrudes a nut and bolt tie-rod assembly. In the final stage of assembly as the beam is set in place and forced downwardly the legs are forced to pivot about the tie-rod and the restriction provided by the horizontal width of the shelf converts any downward force on the beam into a wedging action which binds the cross-beam into position, thereby providing a very sturdy sawhorse.

It is an object of this invention to provide a wedging sawhorse which is simple and relatively inexpensive.

It is an object of this invention to provide a wedging sawhorse which is easily disassembleable and assembleable.

It is an object of this invention to provide a wedging sawhorse which when utilized as a support member, the strength of the cross-beam to the legs is made greater with exertion of additional downward pressure on the cross-beam.

It is an object of this invention to provide a wedging sawhorse apparatus which requires no additional parts to attach the legs to the cross-beam of the legs and cross-beams themselves.

It is an object of this invention to provide a wedging sawhorse apparatus which is lightweight and easily portable.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DESCRIPTION OF THE PREFERRED EMBODIMENT

Figure 1:
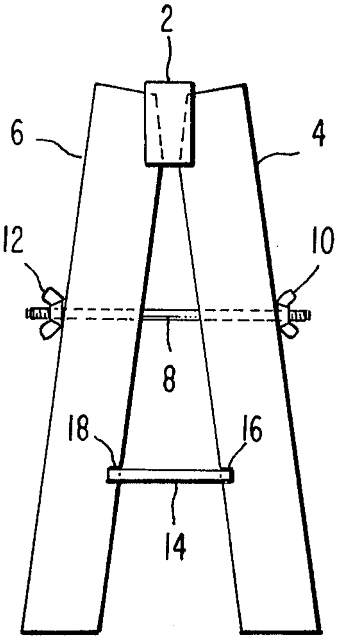
FIG. 1 is an end view of the assembled sawhorse.

In the present invention a cross beam 2 is supported by legs 4 and 6 such that an increase in downward pressure upon the beam more firmly secures it in a wedged position between the upper ends of the legs. This wedging reaction is provided by a tie rod 8 which prevents lateral movement of the legs away from each other at a point below the cross beam 2. While the lateral movement is limited by the tie rod 8, the radial movement of the legs 4 and 6 about the axis provided by tie rod 8 is limited by the width of a spreader or separator means such as shelf 14. The slots 17 and 19 of shelf 14 exerts a reactive force upon the inner edges of legs 4 and 6 at slots 16 and 18. Also, the lateral movement of legs 4 and 6 along shelf 14 is limited by the matching slots of 16 with 17 and 18 with 19.

In this manner the upper oblique edges 11 and 13 of legs 4 and 6 are urged against the inner edges 54 and 55 of slots 24 and 25 and the cross beam is thereby more firmly wedged in position.

The slots 24 and 25 in beam 2 are located at adjacent points on both sides of the beam. The slots are shallower in the top portion thereof and deeper at the bottom portion such that a trapezoidal cross-section 40 is formed on the beam at the point where the slots are cut. The wider of the two parallel sides of the trapezoidal cross-section is at the upper portion of the beam thereby forming a wedge for movement downwardly.

As this trapezoidal cross-section 40 is forced downward the inner edges 54 and 55 press against the oblique edges 13 and 11 and thereby urge them apart. In this manner the upper ends of legs 4 and 6 are forced apart in the directions shown by arrows 60. This force is transmitted to the outer edges of the legs which abut and exert pressure upon wing nuts 10 and 12 so as to cause pivotal movement of the legs about tie rod 8.

This pivotal movement causes the lower sections of legs 4 and 6 to be pressed inwardly along the line shown by arrows 67. In response to this force as the lower ends of legs 4 and 6 at slots 16 and 18 move inwardly they will exert lateral pressure on shelf 14 through slots 16 and 18. The movement of the legs with their slots 16 and 18 toward one another will be limited by the width of shelf 14 after subtracting the depth of slots 17 and 19. once the distance between slot 16 and 18 is equal to this width of shelf 14, an equal and opposite force will be exerted upon the lower ends of legs 4 and 6 in the direction shown by arrows 68. This equal and opposite reaction force will be transmitted through tie rod 8 such that a force as indicated along arrow 69 will be exerted inwardly. The oblique edges 11 and 13 will then firmly bind against inner groove edges 54 and 55 of trapezoidal wedge 40.

Figure 2:
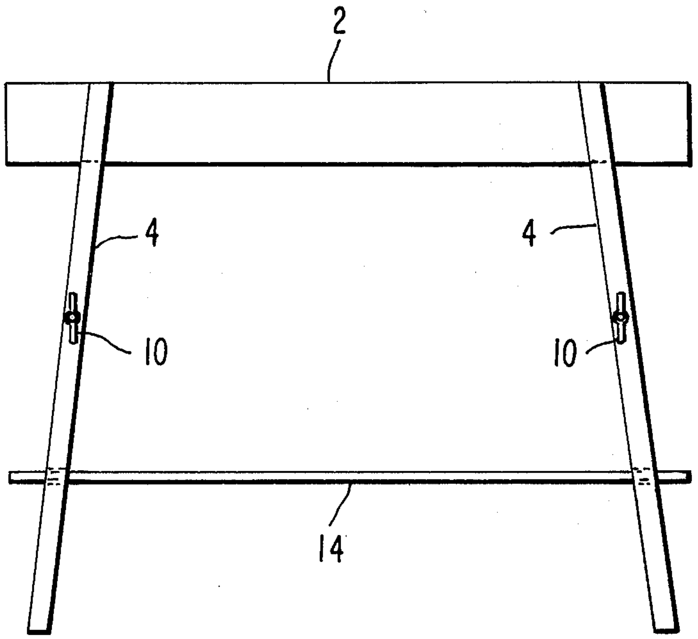
FIG. 2 is a side view of the assembled sawhorse.
Figure 3:
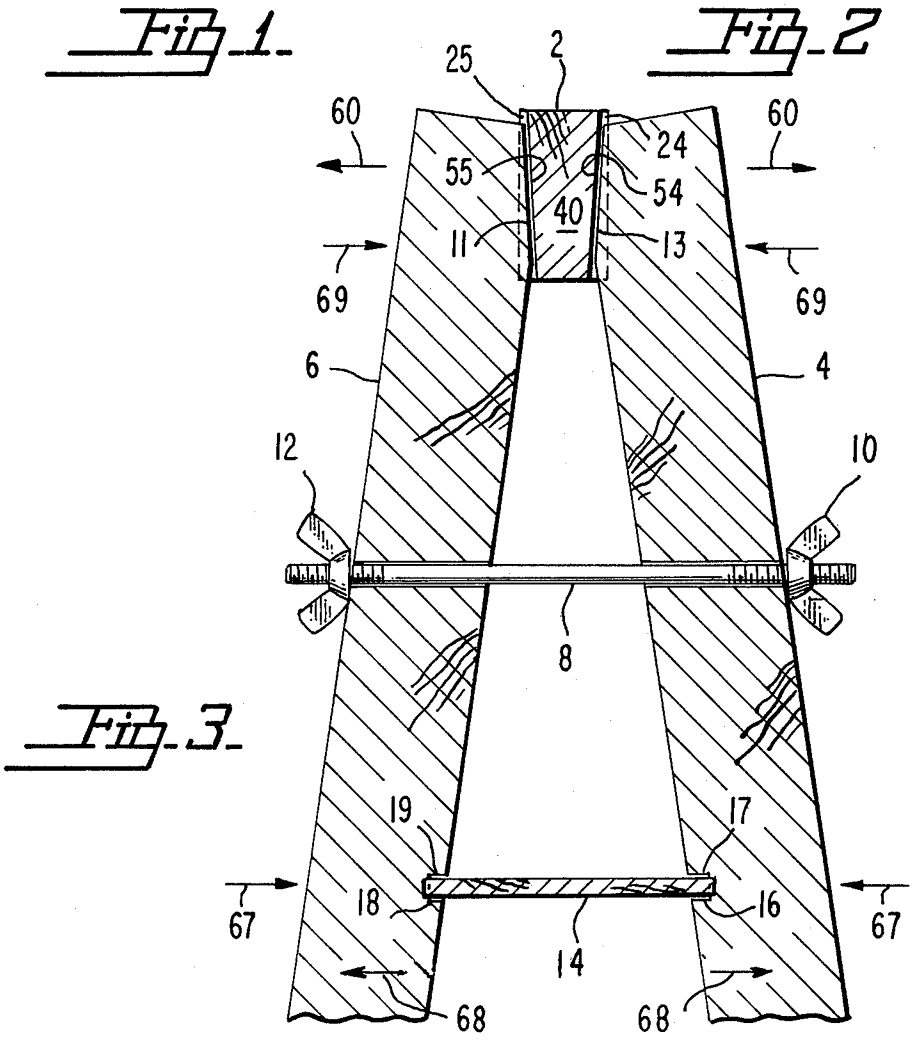
FIG. 3 is a side sectional view of the beam slot construction.

In a preferred form of this invention the angle of inclination outward of each leg set should be approximately 70° as shown on angle A in FIG. 2. At this angle the resistance to loading failure is maximized due to balancing between the failure modes of wood-fracturing and toppling.

The preferred point of location of tie rod 8 is chosen at a point between beam 2 and shelf 14 such that when the beam is forced downward the pressure on the beam exerted by edges 11 and 13 is equal to the pressure between slots 16 and 18 and shelf 14. This exact location will vary according to a variety of parameters including the materials chosen for all the constituent parts and all the various relative dimensions.

While a particular embodiment of this invention has been shown in the drawings and in the description above, it will be apparent, that many changes may be made in the form, arrangement, and positioning of the various elements of the combination. In consideration thereof, it should be understood that the preferred embodiment of this invention disclosed herein is intended to be illustrative only and not intended to limit the scope of the invention.

I claim:

1. A wedging sawhorse comprising:

a. a plurality of pairs of legs having obliquely tapered upper edges, said legs having slots therein located between the opposite ends thereof;

b. at least one spacing means securely mounted between said legs in said slots;

c. an adjustable tie rod means attaching each pair of said legs at a point above said spacing means; and d. a beam mounted between said obliquely tapered edges of adjacent pairs of said legs, said beam having angular tapered grooves for receiving said obliquely tapered edges therein, said grooves being deeper at the lower end thereof to complement the obliquely tapered edges of said legs, tension between said legs and said beam being adjustable by relative vertical movement therebetween due to said beam being mounted above and spaced from said tie rod means such that as said beam is pressed downward the upper ends of said pairs of legs are moved apart and pivot about the tie rod means with the movement being limited by the width of said spacing means.

2. A wedging sawhorse as defined in claim 1 wherein said tie rod means comprises;

a. a threaded stud passing through each pair of adjacent legs; and b. a pair of wing nuts on opposite ends of said stud adjustable to press said legs toward each other.

3. The wedging sawhorse as defined in claim 1 wherein said beam at said grooves is of a trapezoidal cross-section.

4. A wedging sawhorse comprising:

a. a horizontal beam provided with pairs of longitudinally spaced slots located on opposite sides of the beam and presenting downwardly and inwardly inclined surfaces;

b. pairs of legs having inwardly and downwardly inclined surfaces thereon located near the upper ends of said legs and positioned in said slots in said beam;

c. adjustable tie rods extending between the legs of each of said pairs thereof at points below the upper ends of the legs and spaced from said beam; and d. rigid spreader means located between the legs of each of said pairs thereof at points below said tie rods and operable to oppose inward movement of the lower portions of said legs upon spreading of the upper portions of said legs in response to downwardly exerted pressure applied to said beam causing said beam to move downward with respect to said pair of legs.

5. The sawhorse as defined in claim 4 including mating slots in said spreader means and in said pair of legs to maintain approximately 70° angular relationship therebetween.

* * * * *